Nov. 10, 1959     A. C. HALLER     2,912,335
PROCESS FOR PRESERVING EGGS
Filed Sept. 26, 1956
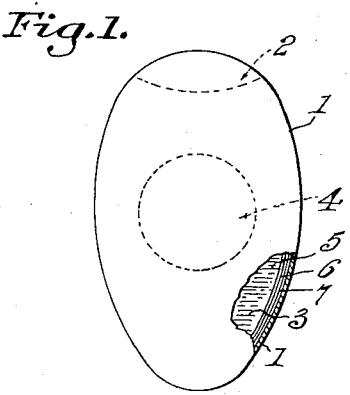
Fig.1.
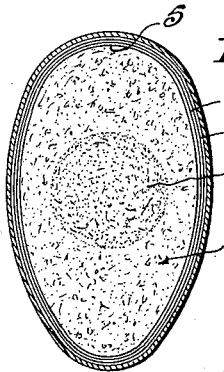
Fig.2.
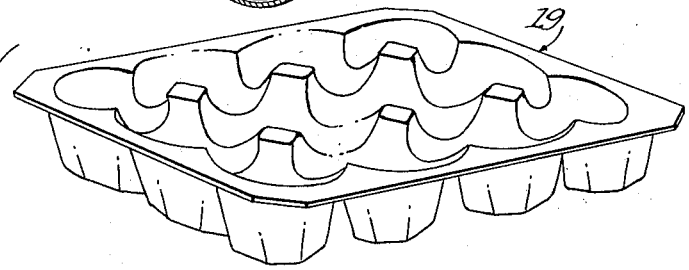
Fig.3.
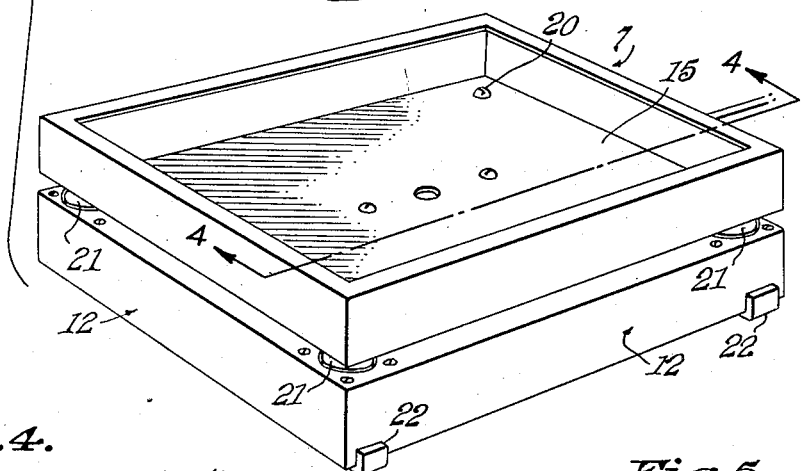
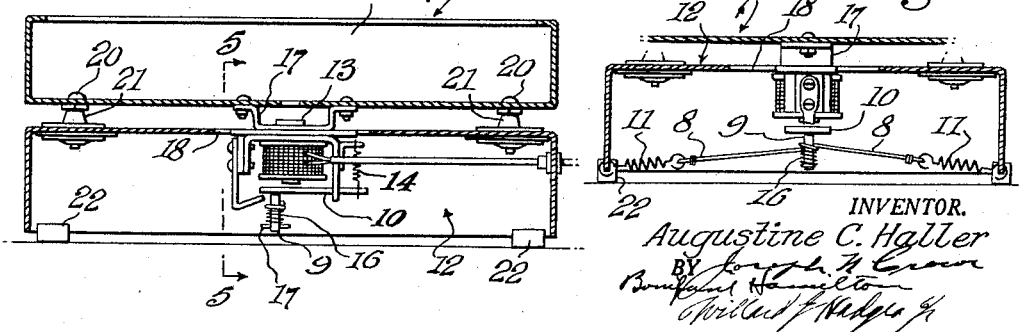
Fig.4.     Fig.5.
INVENTOR.
Augustine C. Haller
BY
ATTORNEYS

United States Patent Office 2,912,335
Patented Nov. 10, 1959

2,912,335

PROCESS FOR PRESERVING EGGS

Augustine Charles Haller, Sterling, Va.

Application September 26, 1956, Serial No. 612,340

3 Claims. (Cl. 99—161)

(Granted under Title 35, U.S. Code (1952), sec. 266)

The invention described herein may be manufactured and used by or for the Government for governmental purposes without the payment of any royalty thereon.

This invention relates to a method for preserving eggs and more particularly to a method for freezing fresh eggs in their unbroken shells.

It is a well known fact that if fresh eggs are frozen, the shells will crack because the contents of the eggs shrink considerably more than the shell itself setting up stresses in the inner and outer shell surfaces which cause it to crack. Such cracking permits bacteria present on the shell surface and the surrounding environment to enter the contents of the egg and begin the process of deterioration of the contents.

In order to prevent cracking of the shells of fresh eggs when they are subjected to freezing conditions, the patented art discloses a variety of methods which include pretreating the eggs by dehydration to reduce the ratio of free water to bound water; sterilizing the shell to prevent outside bacteria entering the shell and immediately chilling the contents in a germicidal bath; coating and precooling eggs with an odorless, tasteless mineral oil and maintaining the eggs in the oil until the eggs have been cooled, removing the excess oil and by breaking and separating the contents from the shell, depositing the separated contents in compartmented containers and freezing the contents in the containers.

It is apparent that all these processes require some conditioning of the eggs before or during the freezing process or require expensive processing including the additional steps of removing the contents of eggs for repackaging before freezing.

An inherent advantage of the instant invention is that the present method permits transporting fresh eggs without the attendant breakage which causes substantial monetary losses each year in the course of handling and shipping eggs.

It is therefore a principal object of the present invention to provide a method for freezing fresh eggs directly which prevents the shells from cracking.

It is a further object of the present invention to provide a method for freezing fresh eggs directly which requires no preliminary conditioning of the eggs to avoid cracking the shells.

It is a further object of the present invention to provide a method for freezing fresh eggs without cracking the shells, which method does not alter the quality or character of the contents which would limit their ultimate use and salability.

It is a further object of the present invention to provide a method wherein the steps for accomplishing the freezing of fresh eggs may be carried out simultaneously, thereby realizing savings in time and money.

It is a further object of the present invention to provide a method for freezing fresh eggs involving simple, inexpensive equipment which may be automatically controlled and may be operated in a freezing environment.

It is another object of the present invention to provide a method for freezing fresh eggs which may be carried out simultaneously during the transportation of the eggs.

It is a further object of the present invention to provide a simple process for freezing fresh eggs directly and which permits transporting fresh eggs in the shell without the inherent danger of breakage.

These and other objects will be apparent as the description proceeds, in which—

Fig. 1 represents a whole fresh egg prior to processing with a portion of the shell broken away;

Fig. 2 is a central vertical sectional view through a fresh egg subsequent to processing;

Fig. 3 is an exploded perspective view of a form of vibrator suitable for carrying out the instant process;

Fig. 4 is a vertical sectional view taken on the line 4—4 of Fig. 3; and

Fig. 5 is a vertical sectional view taken on the line 5—5 of Fig. 4.

Reference is now made to Fig. 1 representing an unbroken fresh egg having an outer shell 1, an air chamber 2 at the blunt end thereof, a liquid white portion 3 consisting chiefly of albumen, and a yolk 4 which contains nutrient proteins and lecithins. Between the outer shell 1 and the contents of the egg are three inner skins or membranes of varying thickness with the thickest 5 innermost, a slightly thinner one 6, and the outermost and thinnest 7. These membranes induce the osmotic action through ventricular action, by which an egg can take in oxygen laden moisture but cannot breathe it out. These membranes function in a similar manner to the ventricles of a human heart or check valve in a mechanical device, only microscopically. If the egg is not incubated or maintained under proper storage conditions, it decays.

The usual methods for preserving fresh eggs by freezing have certain disadvantages which, as described above, include preliminary processing prior to freezing and are not as economical in time and money as my novel process.

I have discovered that if a fresh egg is vibrated at low audible frequencies while simultaneously being subjected to freezing temperatures or in an ambient freezing environment, the liquid white and yolk portions, 3 and 4, respectively, are each transformed to a fine, creamy, crystalline condition in which the crystals formed from the liquid white portion 3 expand into the air chamber 2 without cracking the shell. The process inhibits osmosis and prevents natural decay, and of course inhibits the natural rate of metabolism of the egg.

The discovery of my unique process was made while testing a piece of vibrating equipment in a home refrigerator which was regulated for below freezing temperatures. The vibrating equipment was placed in operation inside the refrigerator cabinet in a below freezing environment and a half dozen fresh eggs in a conventional egg carton were inadvertently placed on the vibrating equipment. Another half dozen fresh eggs in a conventional egg carton were also in the refrigerator at the time of testing the vibrating equipment, but on a shelf in the refrigerator and not in contact with the vibrating equipment. After a considerable period of operation, the vibrating equipment in the freezing environment in the refrigerator was inspected. At that time it was noted that none of the half dozen fresh eggs on the vibrating equipment had a cracked shell, while each one of the half dozen fresh eggs set apart in the refrigerator, not in contact with the vibrating equipment, had cracked shells. Other food products in the refrigerator during the test had also frozen.

Further investigation, which included cutting the frozen eggs in half longitudinally with a fine tooth saw, revealed that the former liquid white and yolk portions, 3 and 4, respectively, had been transformed to a fine, creamy crystalline state and the crystals formed from the liquid white had expanded so that the air chamber 2 was occupied by crystals. The crystals formed from the liquid white portion 3 and the yolk portion 4 remained separated as shown in Fig. 2. This discovery was followed by the construction of a vibrator such as shown in Figs. 3, 4, and 5, and further tests conducted to conclusively verify the results. It is to be understood that the vibrator equipment may take other structural forms and the vibrations may be produced by means other than the electromechanical vibrator shown generally at 7 in Figs. 4 and 5. Such other sources may include purely mechanical type vibrators, electric motor driven mechanical vibrators involving ratchet and cam devices, sonic vibrators, purely electronic devices for producing vibrations, or electronic, electrical or mechanical vibrators which, while not directly in contact with the eggs being processed would be transmitted to the eggs to induce vibrations therein. Further, it is contemplated that means used for transporting fresh eggs such as refrigerated freight cars, trucks, ships, and aircraft could be built to include vibrating equipment so that the fresh eggs could be processed and frozen while in transit. Additionally, it is contemplated that commercial storage facilities and home refrigerators and freezers be equipped with vibrating equipment in the freezing chambers or spaces so that fresh eggs may be placed in these freezing environments and processed by simultaneously being vibrated which will eliminate first processing the fresh eggs and then placing them in the freezing storage spaces.

The tests conducted using a vibrator similar to that shown in Figs. 3, 4, and 5, conclusively proved that whole fresh eggs if vibrated at low frequencies while simultaneously subjected to freezing temperatures or in a freezing environment, could be frozen without any cracking of the shell 1. The structure of the particular electromechanical vibrating device shown generally at 7 provided a frequency of vibration of 120 cycles per second when operated from a 60 cycle alternating current source. The doubling in frequency of vibration is accomplished by attaching a wire 8 to post 9 which is secured to the armature 10, and maintaining a tension in the wire 8 by connecting the free ends of the wire 8 to springs 11 which are in turn secured to the sides of the base portion 12 of the vibrator structure. A restraining member, which may be a coil spring 16 and locking member 17, serves to prevent the wire 8 from slipping off the post 9 and maintaining tension. Due to the structure of the electromagnet and the material of the magnet core 13 and the armature 10, the armature 10 would be attracted to the core 13 on each alternation or half cycle of the source of electrical energy which would result in the armature 10 remaining attracted to the core 13 and no vibrations would result. On each half cycle, the flux in the core reverses and the material of the armature 10 is such that the magnetic retentivity or residual magnetism is very small which results in the armature 10 being held by the core 13 on each half cycle. To overcome this, the arrangement of the wire 8 and springs 11, which is a well-known expedient, was resorted to. The effect is that the springs 11 and wire 8 act as an additional spring load on the armature 10 in addition to the opposing force on the armature 10 exerted by the spring 14, which causes the armature 10 to oppose the attractive force of the flux in the core 13 during each half cycle and causes the armature 10 to vibrate 120 times per second when the alternating source is 60 cycles per second. It is possible to employ vibrators which, without benefit of the wire 8 and springs 11, will produce 120 cycle vibrations. For example, the strength or force exerted by the spring 14 may be chosen so that the armature 10 will oppose the attractive force produced by the magnetic flux in the core 13 during each half cycle, permitting movement of the armature 10 during each half cycle or 120 times per second. Alternatively, a permanent magnet may be used in conjunction with the electromagnetic circuit to attract the armature 10 during each cycle also resulting in 60 cycle vibrations. Such expedients are well-known in the electromagnetic art and form no part of the instant invention other than to describe one form of apparatus which may be used to carry out my novel process. The actual tests conducted, to confirm the discovery, used the 60 cycle alternating current because of convenience, and the electromagnet was so constructed to produce 120 cycles per second. It is presumed that the fine crystals obtained are due to the vibration of the eggs while being frozen. Ordinarily, freezing without vibration will produce large crystals and it is presumed that such large crystals cause cracking of the shell of a fresh egg when subjected to a freezing process. It is therefore considered that a wide range of frequencies may be used. It is known, however, that 120 cycles per second produces desirable results.

The particular form of vibrator illustrated in Figs. 3, 4, and 5, in addition to the base portion 12 and vibrator shown generally at 7, includes a receptacle or tray portion 15 to which the vibrator is secured through a bracket 17. The base portion 12 has an opening 18 sufficiently large so that the vibrator 7 will not contact the base portion 12. The vibrations produced by the vibrator 7 are thus transmitted to the tray 15. An insert 19 in the form of a conventional type egg carton is used to support the eggs and keep them separated while being vibrated in a freezing environment. The tray 15 is mounted in registering position above the base portion 12 for free movement by bolts 20 passing through the bottom of the tray 15 adjacent the four corners thereof. The bolts 20 pass through resilient grommets 21 mounted on the base portion 12. The tray 15 is therefore free to move or vibrate when the vibrator 7 is energized from the 60 cycle source. The base portion 12 is provided with resilient members 22 clamped over the edges which serve as shock mounts.

To practice the process of the instant invention, fresh whole unbroken eggs are placed in the separate compartments of the insert 19, situated in tray 15. The vibrator 7 is energized from a 60 cycle alternating current source to cause the tray 15 to vibrate, and the entire vibrator assembly as shown in Fig. 3 is placed in a freezing environment where the eggs are simultaneously subjected to vibration of 120 cycles per second and freezing temperatures. In tests conducted to verify the discovery, a refrigerator was used and the temperature control set for about —10° F. The eggs were kept in this environment while being simultaneously vibrated for a period of about two hours. At the end of this time, the eggs were in a frozen condition but did not have cracked shells. The frozen eggs were stored without vibration overnight in a temperature of +10° F. and upon inspection it was noted that the shells had not cracked. Eggs so frozen and sawed open longitudinally showed that the white portion and yolk portion had been changed from a liquid state to a fine, creamy crystalline state, with the white portion and yolk portion completely separated and the air chamber 2 filled with crystals formed from the white liquid portion.

Eggs frozen by this process were used over a period of three months. After thawing, the eggs so processed were cooked, and no change in quality or taste was noticeable as compared to an unfrozen fresh egg. Since the whites and yolks do not intermix in the process, the eggs frozen by my process may be used and prepared in the same manner as fresh unfrozen eggs.

The actual tests of the process were conducted at —10° F. and for two hours. It was noted while testing the process that when fresh, whole, broken eggs were placed in a breaker covered with a Pliofilm top and vibrated in a freezing environment of about —5° F., the time required to freeze the eggs was so long as to be impractical. However, when the temperature of the environment was dropped to about —10° F., rapid freezing of the eggs in the covered beaker took place. Additional tests were conducted using fresh, whole, unbroken eggs which were vibrated in a freezing environment of about —10°

F. In these latter tests the vibrated, unbroken eggs were successfully frozen in a period of approximately two hours and were then successfully stored at +10° F.

Having thus described my invention, what I claim as new and wish to secure by Letters Patent is:

1. A method for preserving eggs which comprises arranging fresh, whole, unbroken eggs in the shell in spaced relation, and thereafter vibrating the fresh, whole, unbroken eggs in the shell at low, audible frequencies while simultaneously subjecting the eggs to temperatures of approximately ten degrees below zero Fahrenheit for approximately two hours and thereafter storing the eggs in a freezing environment.

2. A method for preserving eggs which comprises introducing fresh, whole, unbroken eggs in the shell in spaced relation into a freezing environment, vibrating the fresh, whole, unbroken eggs in the shell at low, audible frequencies while simultaneously subjecting the eggs to temperatures of approximately ten degrees below zero Fahrenheit, and controlling the duration of such vibrating action to terminate in approximately two hours and storing the eggs in a freezing environment.

3. A method for preserving eggs which comprises arranging fresh, whole, unbroken eggs in the shell in spaced relation, and thereafter vibrating the fresh, whole, unbroken eggs in the shell at approximately 120 cycles per second while simultaneously subjecting the eggs to temperatures of approximately ten degrees below zero Fahrenheit for approximately two hours and storing the eggs in a freezing environment.

References Cited in the file of this patent
UNITED STATES PATENTS

| | | |
|---|---|---|
| 2,316,861 | Hansen | Apr. 20, 1943 |
| 2,471,626 | Kaloyereas | May 31, 1949 |

FOREIGN PATENTS

| | | |
|---|---|---|
| 1,592/3 | Australia | July 28, 1931 |

OTHER REFERENCES

Journal of Milk and Food Technology, November 1954, vol. 17, No. 11, pp. 334 to 339, inclusive, article entitled "Some Factors Affecting Gelation of Frozen Egg Yolk."